United States Patent [19]
Derkach

[11] Patent Number: 5,378,414
[45] Date of Patent: Jan. 3, 1995

[54] METHOD OF FORMING PACKAGING COMPOSITIONS

[75] Inventor: William J. Derkach, Lewisville, Tex.

[73] Assignee: Recot, Inc., Wilmington, Del.

[21] Appl. No.: 98,794

[22] Filed: Jul. 29, 1993

[51] Int. Cl.6 .......................... B29C 47/06; B32B 9/04
[52] U.S. Cl. ...................................... 264/22; 264/171; 264/210.7; 264/290.2
[58] Field of Search ...................... 264/171, 22, 290.2, 264/210.1, 210.7

[56] References Cited

U.S. PATENT DOCUMENTS

| | | |
|---|---|---|
| 3,616,187 | 10/1971 | Ottmann et al. . |
| 3,819,773 | 6/1974 | Pears ................................. 264/171 |
| 4,343,851 | 8/1982 | Sheptak . |
| 4,371,489 | 2/1983 | McGrail .............................. 264/171 |
| 4,391,767 | 7/1983 | Pears ................................. 264/290.2 |
| 4,439,493 | 3/1984 | Hein et al. . |
| 4,897,235 | 1/1990 | Rosenthal et al. .................. 264/171 |
| 4,939,035 | 7/1990 | Swofford . |
| 5,156,904 | 10/1992 | Rice et al. . |
| 5,284,892 | 2/1994 | Brodie, III et al. . |

FOREIGN PATENT DOCUMENTS 2099754 12/1982 United Kingdom ................ 264/171
WO93/01049 1/1993 WIPO .

Primary Examiner—Mathieu D. Vargot
Attorney, Agent, or Firm—Jones, Day, Reavis & Pogue

[57] ABSTRACT

A process to produce a packaging film through the addition, in a unique continuous in-line application, of interactive/barrier material with a sealant layer disposed thereover during the packaging film production prior to the tenter operation.

12 Claims, 3 Drawing Sheets

METHOD OF FORMING PACKAGING COMPOSITIONS

BACKGROUND OF THE INVENTION

1. Field of the Invention

The present invention relates to a method for forming a packaging material having at least one film layer that interacts with a packaged product and/or that provides a barrier between the interior and the exterior of the package. This interactive/barrier layer, as well as a sealant layer, is formed during an in-line process prior to final orientation of the film.

2. Description of Related Art

Oil-containing foods that are packaged and stored at ambient conditions are subject to limited shelf lives in part due to the fact that the oil therein degrades through oxidative reactions. The shelf life of a packaged product refers to that period of time wherein the qualities of the product are not discernibly different from freshly made product. Over time, moisture changes and oil degradation will adversely affect the aroma, texture, and taste of the packaged food. Such concerns have been addressed in the past by packaging oil-containing foods in packages that contain moisture and oxygen barrier films, opaque films that reduce light-struck reactions, and by flushing the package with an inert gas such as nitrogen. These measures are successful to some degree in extending the shelf life of oil-containing packaged foods. Inevitably some degradation of food product within a package will occur and the measures taken to prevent oxidation, such as the use of barrier films, then act to entrap the undesirable by-products, such as the aldehydes that impart off-flavors associated with rancidity and that contribute to staling of the food product.

Further, recent prior art approaches to extending shelf life not only include ways to reduce the oxidative degradation of oil but they also give consideration to build-up of oxidative by-products within the package such as aldehydes. These approaches utilize a layer in the packaging material that has a desired unique physical packaging property. As defined herein, unique physical packaging property means a property of a packaging material layer that interacts with a packaged food product and/or that provides a barrier of some type between the interior and the exterior of the package. Such barrier may inhibit moisture, oxygen, light and the like from entering or leaving the package. Therefore a film layer having a unique physical packaging property such as scavenger of oil degradation products has been used as a film layer of the package to absorb or scavenge the oil degradation products. Details of films having such unique physical packaging properties are disclosed in PCT application No. PCT/US92/05514 and Publication No. WO 93/01049 and incorporated herein by reference in its entirety. Thus, the package is constructed in such a way that oil degradation by-products build-up within the package is significantly reduced.

A preferred aldehyde-absorbing composition known in the art is polyethyleneimine (PEI). Polyethyleneimine contains primary and secondary amine groups that are highly reactive with aldehydes such as pentanal, hexanal, and heptanal, but significantly less so with other organic compounds such as 2-methylbutanal, toluene, methylpyrazine and 4-heptanone. Polyethyleneimine may be used in direct contact or, preferably, in indirect contact with foods and is stable when disposed within a packaging material. It is known as a primer for laminated film structures that can be used as packaging materials. In U.S. Pat. No. 4,439,493 to Hein, et al., polyethyleneimine is disclosed as a primer for a multilayer oriented heat sealable film structure. This reference is representative of the use of polyethyleneimine in prior art packaging material. Other coating compositions than PEI also provide unique packaging physical property improvements such as moisture barrier, flavor-aroma barrier, oxygen absorption, flavor enhancements and the like. Examples of such coatings, in addition to PEI, include acrylic, PVOH, flavorants, oxygen absorbers, and PVDC.

The difficulty with the prior art arises in attempting to form a packaging material having a layer of film with a desired unique physical packaging property wherein the finished product is relatively inexpensive and also has superior desired properties. Generally, the prior art requires expensive, critical steps in the application of a layer of material having the desired unique physical packaging properties to a base layer such as polypropylene or the prior art uses an out-of-line process to form the various layers of the packaging material and does not always provide a packaging film that will produce the desired function and have the necessary physical properties at reasonable costs.

For example, in U.S. Pat. No. 5,156,904 an in-line process is disclosed to extrude PEI on a base film prior to its being stretched in an orthogonal direction. After being stretched orthogonally, the film made by this process can then be coated in an out-of-line process with an extruded layer of copolymer or bonded to a polymer such as SURLYN ® 1703 produced by I. E. DuPont DeNemours Company of Wilmington, Del. to form a multilayered product. However, the additional steps in an off-line process are expensive. Also, since the film is stretched before applying the extruded layer of copolymer or polymer such as SURLYN ®, the extruded layer of copolymer or the SURLYN ® is frequently thicker than necessary. For instance, in food packages, disclosed in PCT/US92/05514 above, the sealant is coated on PEI to separate it from the food product and to allow the PEI to act as a scavenger. The greater the thickness of the sealant, the less desirable the result because of the greater distance the volatile materials must travel to reach the PEI.

SUMMARY OF THE INVENTION

The present invention combines the economics of an in-line film process with extrusion coating to achieve the unique physical packaging properties desired. In this process, a film layer having the desired unique physical packaging properties is coated on a base film in the coating operation after machine direction orientation (MDO) of the base film and prior to the tenter orientation. A sealant is also extrusion coated onto the coated surface of the MDO-oriented film. The sealant may be a polyolefin sealant of the type such as E-P (ethylene-propylene) copolymers, terpolymers, and ionomers. The resulting multilayered material is then put through the tenter operation to fully orient the film. Using this process, the film layer with the desired property can be applied in-line and without exposure to he heat history associated with the normal extrusion process. A coating station, dryer, and a sealant extrusion coating operation are incorporated in-line into a standard polypropylene film line to produce the entire structure.

The novel process can also be adapted to differentially coat each side of the base film material with a film layer having a unique physical packaging property to produce unique film products. These unique film products are especially important for worldwide use since nitrogen flushing of a package is not readily available on a worldwide basis. Thus the present film formed with the unique method of the present invention improves product quality even without the ability to flush the product package with nitrogen.

Therefore, it is an object of the present invention to provide a novel process of forming packaging compositions that extend the shelf life of oil-containing foods.

It is also an object of the present invention to coat a film layer having a unique physical packaging property and apply a sealant thereover after machine direction orientation and prior to the film being subjected to the tenter operation.

It is still another object of the present invention to provide an extrusion coated sealant on a layer of PEI formed on the base film material prior to the tenter operation where the film is fully oriented.

It is also another object of the present invention to apply the PEI to a nonsealable film in an in-line operation without the PEI being subject to the heat history associated with the normal extrusion process.

It is still a further object of the present invention to provide a process for differentially coating both sides of the nonsealable film to produce unique film products.

It is also an object of the present invention to provide a process for forming a product life-extending packaging material of a flexible polymer that may be laminated to other materials that include moisture and oxygen barriers.

Thus, in a preferred embodiment, the in-line process of the present invention forms a resulting packaging material that includes a composition capable of reacting with oil degradation by-products which renders the by-products immobile, the composition being hereafter referred to as a volatile scavenger material (VSM), and the composition being incorporated in an oil-containing food packaging material formed during the in-line process in such a way that, when the material is used to package food, the oil degradation by-products are exposed to the VSM. Oil degradation by-products are predominantly aldehydes. One aldehyde, hexanal, is a relative indicator of the oil-containing food product acceptability, as hexanal is a by-product of linoleic acid oxidation. As the product ages, the amount of hexanal developed in a sealed package containing the product will increase.

As used herein, reference to the oil-containing food product will be with respect to fried potato chips which have an oil content of about 30 percent by weight, although it is understood that any oil-containing food product that is stored for any time under ambient conditions will likewise benefit from the invention. Other oil-containing products contemplated as beneficiaries of the subject process include other low moisture salty snack foods such as corn chips, tortilla chips, extruded corn-based snacks, pretzels, popcorn, bakery items such as cookies, muffins, and cakes, crackers, oil-based seasoned products, fat-containing confectioneries, dairy products, cooking oils, cereals and the like.

Any composition capable of absorbing an effective amount of aldehydes, as defined hereafter, and suitable for use in direct or indirect contact with food may be used in accordance with the present teaching to extend shelf life. In selecting the aldehyde-absorbing composition, the composition's selective preference for aldehyde absorption must be considered. Other organic compounds exist within the sealed package that impart aromas and flavors associated with the food product that enhance the organoleptic properties of the food. The pyrazines are examples of such organic compounds. Aldehyde-absorbing compositions that also scalp significant amounts of desirable organic compounds may function to extend shelf life but also produce a bland, flavorless food product. Thus the selection of the aldehyde-absorbing composition should also give consideration to the composition's preference for absorbing aldehydes.

Compositions known to absorb significant amounts of aldehydes may be selected from compounds having primary and/or secondary amine groups and strong inorganic bases. Preferably, the aldehyde-absorbing compositions are selected from the group consisting of polymers with a high content of primary amines and strong inorganic bases. Most preferably, the aldehyde-absorbing compositions are selected from the group consisting of polyethyleneimine, polymers containing ethylene diamine, diisopropanolamine, sodium hydroxide, and calcium hydroxide. The composition may be of a type that could be directly exposed to the food product within the package or it may be of the type that may have indirect contact with the food, separated by a functional barrier that prevents direct contact between the aldehyde-absorbing composition and the food product but across which aldehydes can migrate to contact the aldehyde-absorbing composition. In the first type, the aldehyde-absorbing composition may be disposed as the inner layer of an in-line formed packaging material for direct contact with the food product and the generated aldehyde by-products. In the second type, the aldehyde-absorbing composition may also be disposed as a discrete layer or thin film within an in-line produced packaging material for indirect contact with the food product. Such embodiments will function in accordance with this disclosure if the generated aldehydes can migrate across any intervening layers to contact the aldehyde-absorbing composition.

An effective amount of the aldehyde-absorbing composition must be used. By effective amount, it is meant that a sufficient amount of the aldehyde-absorbing composition is available to absorb aldehydes produced by oil degradation at such a rate and in such amounts that the hexanal levels within the sealed package do not exceed that level indicative of staling during the intended shelf life of the food product. The effective amount will depend upon the reactivity of the selected aldehyde-absorbing composition, the degradation properties of the oil used in the food product, and the migration rate of the aldehydes to the aldehyde-absorbing composition including any intervening materials that may be present per period.

Thus the present invention relates to a continuous in-line process of forming a multilayer packaging film comprising the steps of extruding a base layer for supporting the packaging film, orienting the base layer longitudinally in the machine direction of orientation (MDO), coating one side of the extruded, oriented layer with a film layer in liquid form that provides a unique physical packaging property (such as VSM), drying the coated film layer, extruding a sealant layer on the dried film layer coating, and subjecting the sealant-coated dried packaging film to a tenter process for full orientation of the film.

BRIEF DESCRIPTION OF THE DRAWINGS

These and other objects of the present invention will be more fully disclosed in the following Detailed Description of the Drawings in which like numerals represent like elements and in which.

DETAILED DESCRIPTION OF THE DRAWINGS

Figure 1:
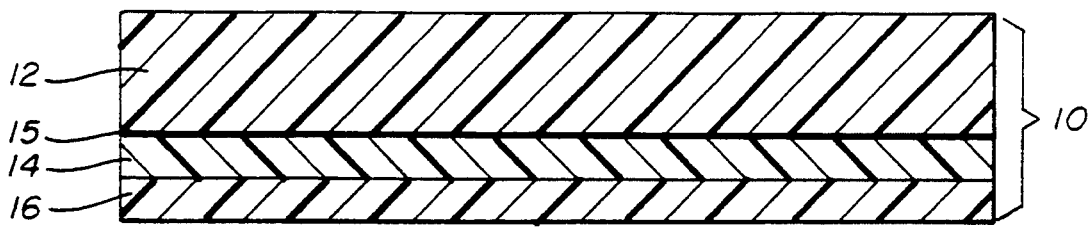
FIG. 1 is a cross-sectional view of the basic film formed by the in-line process of the present invention.

FIG. 1 is a cross-sectional view of a packaging film structure made in accordance with the novel process steps of the present invention. The packaging film 10 depicted represents a conventional structure including a film layer 14 having unique physical packaging properties such as, for example only, an aldehyde-absorbing material contained therein, i.e., polyethyleneimine, in such an amount and positioned in such a manner that it is effective in removing aldehyde by-products formed from oil degradation in food that is packaged with this film 10. For simplicity of discussion, the film layer having the unique physical packaging property will be described as PEI. However, it is understood that any material having a unique physical packaging property and that is compatible with film extruding techniques may be used.

The structure 10 comprises an outer layer 12 from 0.0152 mm to 0.0177 mm (0.0006 in. to 0.0007 in.) thick biaxially oriented polypropylene which imparts strength and moisture barrier properties to the structure.

If necessary, the bottom surface of the polypropylene base layer 12 as shown in FIG. 1, may be prepared or treated, if needed, as represented by the numeral 15 to make it more receptive to receiving the PEI 14 as a volatile scavenger material (VSM). The surface is treated in any well-known manner such as by the use of corona discharge to oxidize the surface to cause better attachment of the next film layer. The polyethyleneimine layer 14 is then formed on the bottom layer of the base layer 12 illustrated in FIG. 1. The process of coating the PEI may utilize a tank holding an aqueous solution of PEI with a roller therein (not shown) which, as it rotates, picks up PEI in pores in the outer surface thereof and across which surface the polypropylene base layer 12 is continuously moving. The PEI layer 14 is then deposited on the polypropylene base layer 12. The temperature of the film at this stage of the process is relatively low and the VSM properties of the PEI are not adversely affected by the heat history associated with the earlier steps of extruding the base layer. The film, coated with PEI, then moves through a dryer where the PEI is dried in a standard drying oven that operates in a well-known manner. The temperature of the film at this stage of the process is relatively low and the VSM properties of the PEI are not adversely affected by this heat treatment. The PEI coated base layer then is coupled to a sealant extruder where a sealant such as SURLYN® 1652SR, available from I. E. DuPont DeNemours and Company, Wilmington, Del., is extruded onto the PEI layer 14 to form the sealant layer 16 shown in FIG. 1. The multilayered film 10 is then coupled to a tenter where the film is oriented in a direction transverse to the movement of the film. Since the polypropylene base layer 12 was oriented longitudinally as it exited its extruder (machine direction orientation), as the film exits the tenter, it is a bidirectionally oriented film. The tenter operation additionally "thins" the sealant. This reduces the amount of sealant needed in the structure and, correspondingly, the distance that a volatile compound must traverse before contacting the VSM layer. Typical tenter steps reduce the layer thickness by a factor of from 5 to 10. Aldehydes, such as pentanal, hexanal, and heptanal, identified by the letters A in FIG. 1, will be produced within a sealed package of oil-containing food, such as potato chips. The aldehydes are capable of passing across the sealant layer 16 as indicated by the arrows in FIG. 1. When the aldehyde contacts an active primary or secondary amine on the aldehyde-absorbing composition thin film 14, it is immobilized and neither contributes to shortening the shelf life of the packaged product nor does it accumulate in the sealed package to create an unpleasant aroma or contribute to off-flavor when the package is opened.

Figure 2:
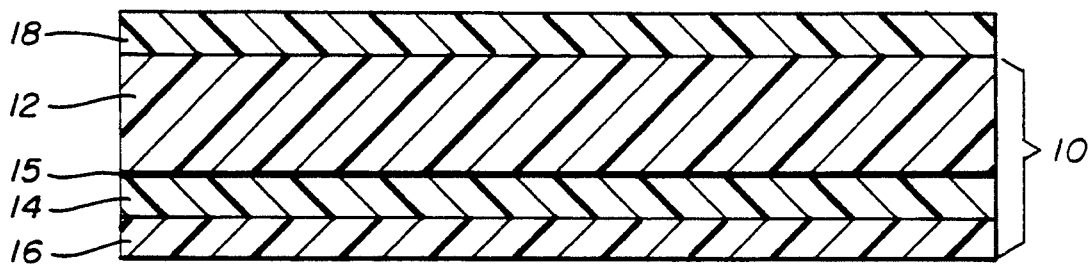
FIG. 2 is a cross-sectional view of the film produced by the novel process of the present invention wherein a bonding layer has been added to the film shown in FIG. 1.

FIG. 2 illustrates the film 10 in FIG. 1 obtained by the novel process which has a bonding layer 18 added thereto. If the bonding layer is required for the purpose of adding a metal film layer, it will be extruded at the same time the polypropylene layer is being extruded. The bonding layer may be formed of E-P copolymer or the like and may have a thickness in the range of 0.01 millimeter to 0.1 millimeter (1-10 gauge).

Figure 3:
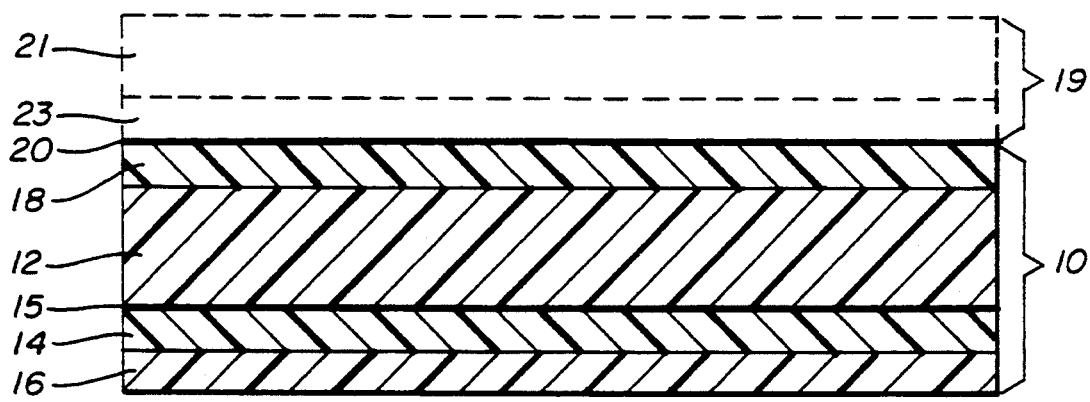
FIG. 3 is a cross-sectional view illustrating how a print layer and adhesive may be attached to the film made by the novel process of the present invention.

FIG. 3 is a cross-sectional view of the novel film 10 formed by the novel process of the present invention and having a film layer 19 attached thereto which includes a polypropylene print layer 21 and a polyethylene adhesive layer 23. Layer 23 could also be a standard water or solvent based adhesive. The layers 21 and 23 are well known in the art and will not be discussed in detail. The bonding layer 18 in this case would serve to form a good attachment of the layers 19 to the film 10.

Figure 4:
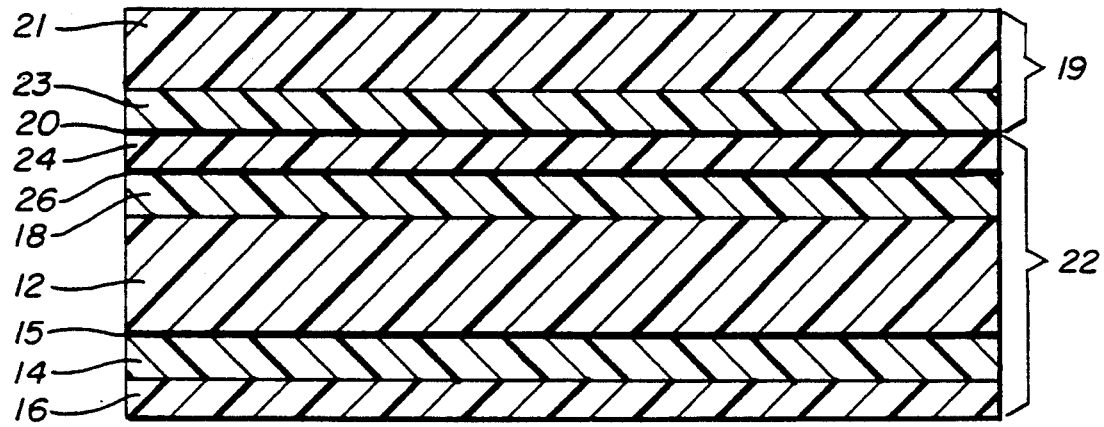
FIG. 4 is a cross-sectional view of an alternate film that may be formed with the process of the present invention which includes a second film layer having unique physical packaging properties that may be formed on the other side of the film illustrated in FIG. 1.

FIG. 4 is a cross-sectional view of an alternate embodiment of the film that can be produced with the novel in-line process. The novel film 22 includes the polypropylene base layer 12, the first film layer 14 having the unique physical packaging property, such as PEI, and the sealant layer 16 to form the film 10 illustrated in FIG. 1 and also includes a second film layer 24 having a unique physical packaging property attached to the bonding layer 18. This second film layer may be, for instance, a layer of PVOH which is known to be a good oxygen barrier. It also may be acrylic, which is an odor barrier material, to provide better flavor to the product. The second layer could also be a layer of SARAN which is a good oxygen and moisture barrier. There are other materials such as oxygen absorbers and flavorants that could also be used as the second film layer 24. The second film layer is produced in a manner similar to the formation of the first film layer, in that the second film layer has a desired property and is applied in-line without exposure to the heat history associated with the normal extrusion process. To the second film layer 24, the polypropylene print layer and PE adhesive layer 19 could be added to form the structure illustrated in FIG. 4.

Figure 5:
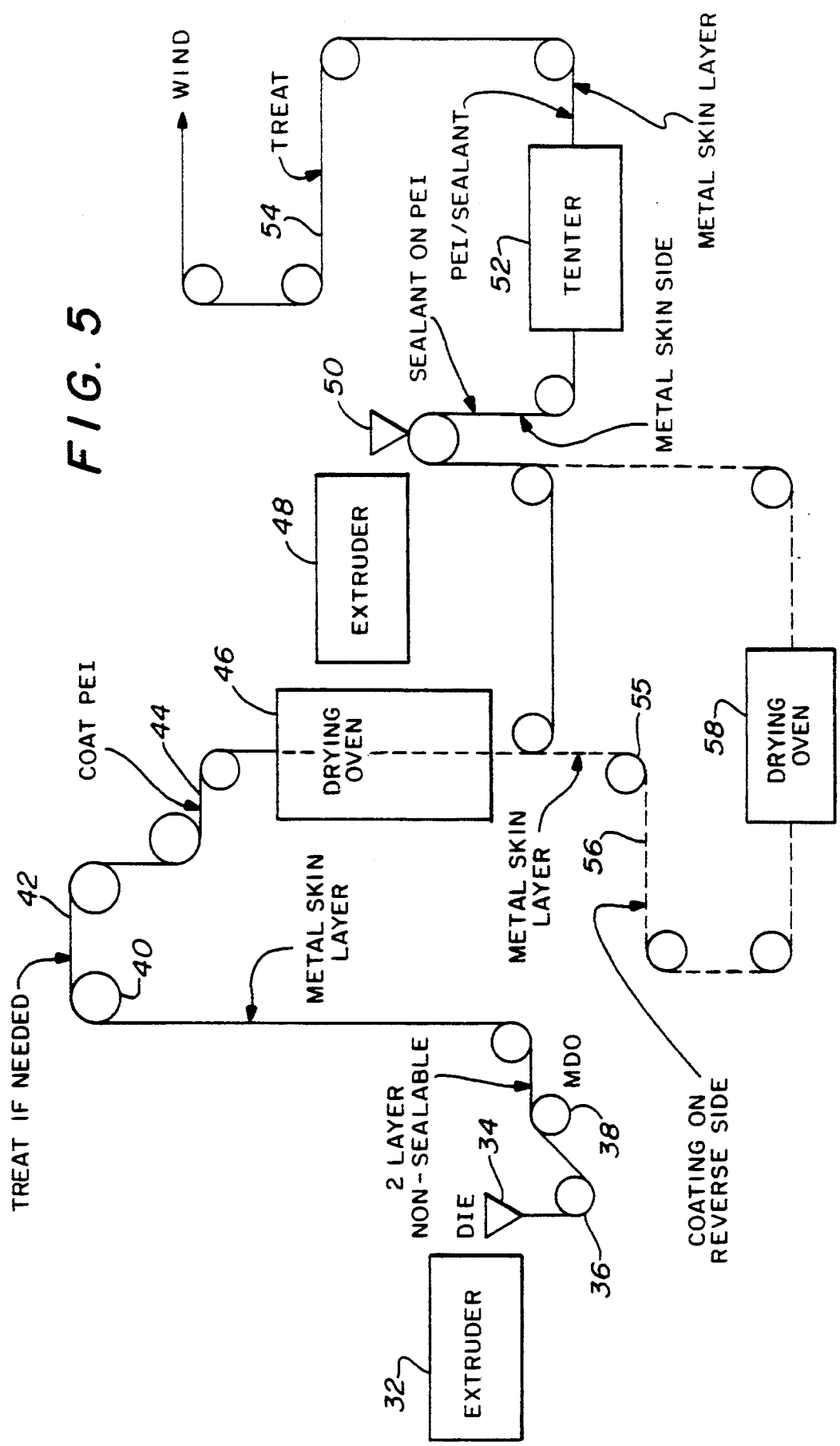
FIG. 5 is a schematic representation of the novel process of the present invention.
Figure 6:
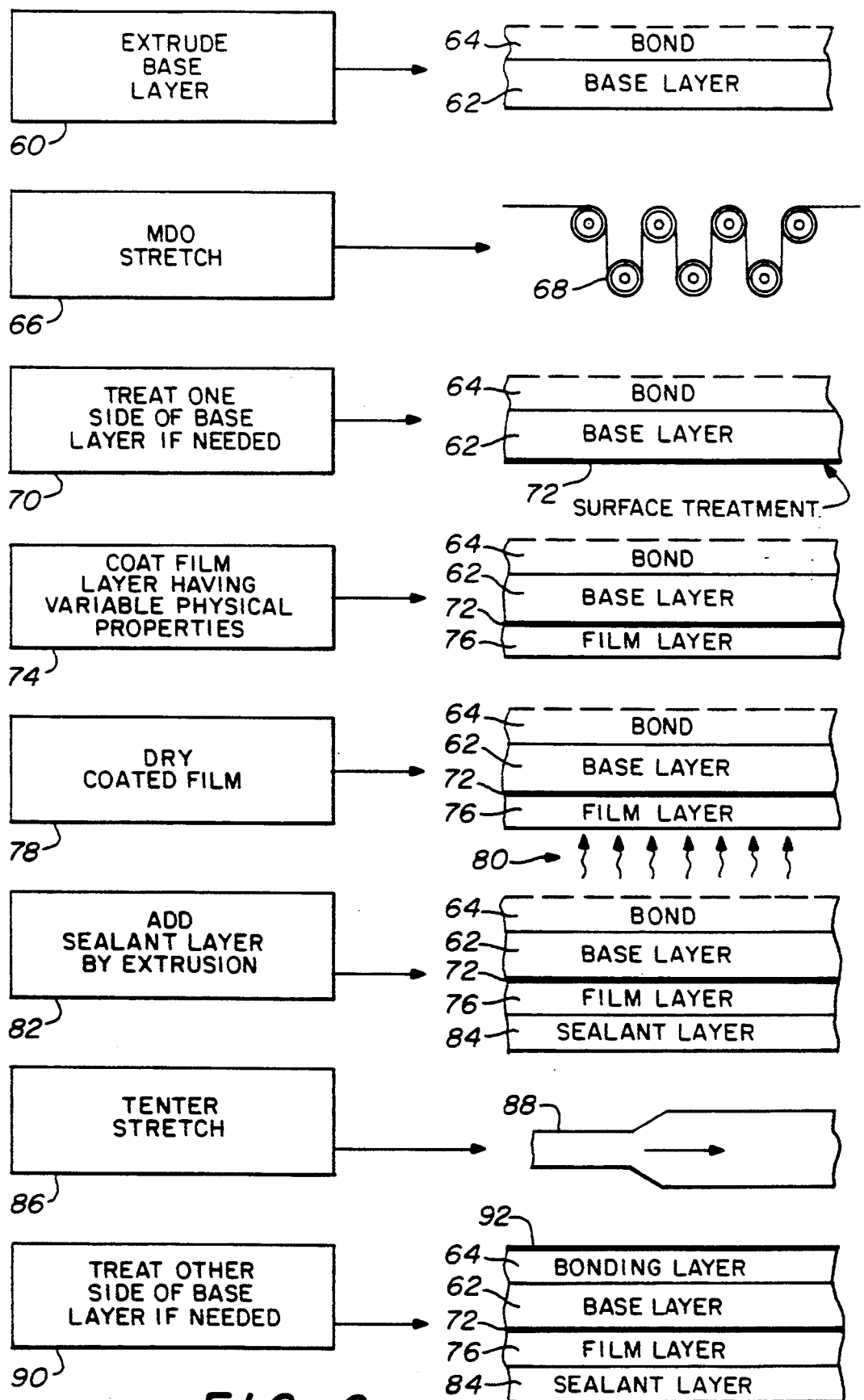
FIG. 6 is a flow chart representing the novel process steps of the present invention.

FIG. 5 and FIG. 6 illustrate the novel process of the present invention. The extruder 32, through die 34, extrudes the base layer 62 as illustrated in step 60 of FIG. 6. The bonding layer 64 may be extruded simultaneously with a similar extruder and included thereon as illustrated by the figure adjacent step 60 if desired and needed for the purpose, for instance, of adding a metal film layer. The extruded base layer 62 then passes through the machine direction orientation rollers 36 and 38 for stretching the film in the longitudinal direction as indicated by step 66 in FIG. 6 in which the rollers 68 are illustrated adjacent step 66 and in which succeeding rollers move faster then preceding rollers, as is well known in the art, to provide the MDO stretch required. The base layer 62 which is MDO oriented then passes over roller 40 and at station 42 is treated on one side, if needed, to prepare the side or surface for receiving the film layer that provides a unique physical packaging property such as PEI or volatile scavenger material. This is shown at step 70 in FIG. 6 and is illustrated in the figure adjacent step 70 by the numeral 72 referring to one side of the base layer 62. The treatment is well known in the art and one manner of treating the surface is to use a corona discharge to oxidize the surface. This oxidation step provides a modified surface that enables a greater adhesion of a material placed in contact therewith. The treated film base layer 62 is then coated at location 44 in FIG. 5 with the film layer having the unique physical packaging property. This is shown at step 74 in FIG. 6 and the resulting film layer 76 is illustrated adjacent step 74. The amount of PEI applied at location 44 is such that on a finished product or dry-coated basis, the amount of PEI will be in the range of 0.005 to 0.2 pound per ream (3000 ft$^2$) and, preferably, 0.05 to 0.1 pound per ream. The PEI coating is applied in any well-known manner and generally uses a well-known process of passing the film over a roller having pores in the surface thereof and which has a portion thereof rotating in a tank of the liquid (not shown) such as PEI and wherein the size of the pores and the speed of rotation determines the thickness of the coating. It is a standard coating process and will not be discussed in detail here.

The coated film is then transferred to a standard drying oven 46 as shown in FIG. 5 where the PEI is dried. This is illustrated at step 78 in FIG. 6 where the heat 80 that is applied to the film layer 76 is shown in the figure adjacent step 78. The dried film is then coupled to an extruder 48 which is a standard extruder associated with die 50 that coats a sealant on the PEI. The sealant may be of any type such as SURLYN®, as discussed previously. This step is shown at step 82 in FIG. 6 with the sealant layer being illustrated by the numeral 84 in the figure adjacent step 82.

The sealant-coated film is then transferred to tenter 52 which is a typical prior an tenter in the form of an oven having a temperature of approximately 200°-300° F. where the film is stretched transversely to the direction of its orientation thus providing a biaxially oriented film. This step is shown in step 86 in FIG. 6 and the stretching is illustrated by the numeral 88 in the figure adjacent step 86. With this process the sealant is approximately 0.001 to 0.0025 millimeter (4 to 10 gauge) in thickness after transverse orientation as compared to the prior art out-of-line process which requires 0.005-0.0125 millimeter (20 to 50) gauge sealant.

Finally, the bonding layer side of the base layer may optionally be treated at 54 again such as with a corona discharge to prepare that surface for attachment to some other film if necessary. This is illustrated at step 90 in FIG. 6 with the treated surface being indicated by the numeral 92 in the figure adjacent FIG. 6.

Also illustrated in FIG. 5 is an alternate embodiment of the invention in which, after the drying oven 46 and before the sealant extruding station 48, an additional station is added to coat on the opposite side of the base film 62 a second film layer that provides a second unique physical packaging property. This coating may be in combination with PEI or may be any other appropriate combination of coating materials. This film may be PVOH to form an oxygen barrier, acrylic to form an oxygen and flavor barrier material, SARAN as an oxygen and moisture barrier, or some other material having a desirable physical packaging property. As shown in dotted lines, the film passes over roller 55 after it leaves the drying oven 46 to a station 56 where the second film layer is applied in a well-known manner as described previously on the opposite side of the film. It is then dried in another oven 58 and then is coupled to extruder 48 for adding the sealant as previously described.

EXAMPLE

The film produced by this invention begins by extrusion of a single or multilayer sheet of polyolefins at 300–600 F. One or more extruders can be used to produce the sheet which can be 40–60 times the final film thickness. The sheet is cooled on a chilled roll, reheated, and machine direction oriented (MDO) on a series of heated rolls each moving faster than the previous roll. The MDO film is now treated and coated with the appropriate coating, e.g., PEI, using a standard gravure coating roll. The coated film is then dried in a drying oven at 200°–300° F. or at a temperature sufficient to remove all or most of the water in the aqueous coating. The time in the dryer is typically less than a minute and usually in seconds. The film is then treated by corona discharge on the side to be coated, if needed, and extrusion coated in-line using standard extrusion coating equipment. The extrusion coating is a sealant of a polyolefin variety which is compatible with the base film and is transverse direction oriented (TDO) at base film orientation process conditions. The sealant applied in this process allows optimum interaction of a product in a product bag, or product degradation by-products, with the coating medium. The sealant layer obtained by in this process is much thinner, typically 4–10 gauge, than can be obtained with an off-line extrusion coating process, typically 50–100 gauge, during film conversion. Also, the extrusion coating of a sealant in the converting process is much more expensive than a sealant applied in-line.

Film coated with PEI and having a sealant thereover and produced by this process has shown to be very effective in scavenging aldehydes as compared to a noncoated film. In the most recent test, the coated film absorbed 91% of the hexanal while the noncoated film absorbed 6%. The film produced in this process with the thin sealant allows for minimum coating weights of the interactive or barrier coatings to be effective.

Thus there has been disclosed a novel process for forming packaging compositions that extend the shelf life of oil-containing foods. A standard film process is combined with an extrusion coating to achieve the desired properties. A material having a unique physical packaging property (such as PEI) is coated on a non-sealable film in the coating operation after machine direction orientation and prior to the tenter operation for providing the bidirectional orientation. After the film layer providing the unique physical packaging property is coated and dried, the material is then coupled to an extruder where sealant is extrusion coated onto the surface of the material having the unique physical packaging property and forming a partially oriented film. The film is then put through the tenter operation to fully orient the film. Thus with the novel process of the present invention, the material having the unique physical packaging property can be applied in-line and without the heat history associated with normal extrusion processes. Further, the novel process provides a finished film thickness that is substantially less than that obtained by a conventional off-line process because the sealant layer is added before the tenter operation with the novel process herein and thus the sealant layer, after transverse stretching, is considerably reduced in thickness. In the prior art the sealant is applied after the tenter operation and the thickness of the applied sealant remains the same. Thus, the film produced by the novel process herein provides a thinner and more permeable barrier through which aldehydes must pass thus providing better scavenging of volatiles by a scavenger material such as PEI and enabling a product to have a longer shelf life. The standard polypropylene continuous film line for the novel process incorporates the coating station, dryer, extrusion coating operation, and tenter operation to produce the entire film structure.

The novel process is also adapted to differentially coat both sides of the film with material having a unique physical packaging property to produce unique film products.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A continuous in-line process of forming a multi-layer packaging film for creating a package to contain a product that degrades and generates unwanted degradation compositions, the process comprising the steps of:
   extruding a base layer for supporting the packaging film;
   orienting the base layer longitudinally in the machine direction of orientation;
   coating one side of the extruded oriented base layer with a film layer in liquid form that acts to reduce the adverse effects of said unwanted degradation compositions caused by said product degradation;
   drying the coated film layer;
   extruding a sealant coating layer on the dried film layer coating to separate said product in said package from said film layer; and
   subjecting the sealant-coated dried packaging film to a tenter process for obtaining full orientation of the packaging film thereby reducing the thickness of the coating layer to increase its permeability to said degradation compositions.

2. A continuous in-line process as in claim 1 further comprising the step of extruding polypropylene as the base layer.

3. A continuous in-line process as in claim 2 further comprising the steps of:
   extruding a bonding layer simultaneously with and adhering the bonding layer to the other side of the base layer; and
   treating the one side of the base layer to prepare the base layer to receive and adhere the coated film layer thereto.

4. A continuous in-line process as in claim 3 further comprising the steps of:
   coating polyethyleneimine (PEI) as said film layer on said one side of the machine direction oriented base layer to form an oil degradation composition scavenger when the packaging film is used to form a package for oil-containing products; and
   forming said sealant coating layer such that it is permeable to said degradated composition so as to enable said PEI to scavenge said degradated composition.

5. A continuous in-line process as in claim 3 wherein the step of coating the one side of the base layer with a film layer further comprises the step of coating PVOH on the oriented base layer as an oxygen barrier.

6. A continuous in-line process as in claim 3 wherein the step of coating one side of the base layer with a film layer further comprises the step of coating acrylic on the oriented base layer as an odor barrier and a flavor improver.

7. A continuous in-line process as in claim 3 wherein the step of coating the one side of the base layer with a film layer further comprises the step of coating SARAN on the oriented base layer as an oxygen and moisture barrier.

8. A continuous in-line process as in claim 3 wherein the step of treating the one side of the base layer further comprises the step of using a corona discharge to cause random oxidation of the bonding surface to create a modified surface for better attachment of the coated film layer thereto.

9. A continuous in-line process as in claim 4 further comprising the step of coating the polyethyleneimine at a level in the range of approximately 0.005 to 0.2 pounds per ream.

10. A continuous in-line process as in claim 9 wherein the range of coating the polyethyleneimine is 0.05 to 0.1 pounds per ream.

11. A continuous in-line process as in claim 1 further comprising the step of extruding the sealant layer on the dried film layer coating so as to have a final thickness of 0.001 to 0.0025 millimeter (4–10 gauge) after the tenter process.

12. A continuous in-line process as in claim 4 further including the steps of:
   coating the other side of the base layer, after the coating on said one side is dried, with another film layer that acts to reduce additional adverse effects of said unwanted degradation compositions caused by product degradation; and
   drying the coated base layer on the other side prior to extruding the sealant layer on said base layer.

* * * * *